(12) United States Patent
Abdelhamed et al.

(10) Patent No.: US 11,631,202 B2
(45) Date of Patent: Apr. 18, 2023

(54) SYSTEM AND METHOD FOR OBTAINING AND APPLYING A VIGNETTE FILTER AND GRAIN LAYER

(71) Applicant: SAMSUNG ELECTRONICS CO., LTD., Suwon-si (KR)

(72) Inventors: Abdelrahman Abdelhamed, Toronto (CA); Michael Scott Brown, Toronto (CA); Jonghwa Yim, Seoul (KR); Jihwan Choe, Seoul (KR); Kihwan Kim, Campbell, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/389,576

(22) Filed: Jul. 30, 2021

(65) Prior Publication Data

US 2022/0222871 A1 Jul. 14, 2022

Related U.S. Application Data

(60) Provisional application No. 63/135,532, filed on Jan. 8, 2021, provisional application No. 63/135,540, filed on Jan. 8, 2021.

(51) Int. Cl.
| | | |
|---|---|---|
| G06T 11/00 | (2006.01) | |
| G06T 5/00 | (2006.01) | |
| G06T 7/00 | (2017.01) | |
| G06K 9/62 | (2022.01) | |
| G06V 10/50 | (2022.01) | |

(Continued)

(52) U.S. Cl.
CPC .......... *G06T 11/001* (2013.01); *G06K 9/6256* (2013.01); *G06V 10/507* (2022.01)

(58) Field of Classification Search
CPC ....... G06T 11/001; G06T 5/002; G06T 7/002; G06T 2207/10004; G06T 7/557; G06T 2207/10052; H04N 5/77; H04N 5/772; H04N 9/79; H04N 5/2254; H04N 5/238; H04N 5/22541; H04N 5/335; H04N 5/3572; H04N 9/07; H04N 9/646; H04N 5/351; H04N 9/70; H04N 1/40012; G06F 3/0482;
(Continued)

(56) References Cited

U.S. PATENT DOCUMENTS

| | | |
|---|---|---|
| 9,594,977 B2 | 3/2017 | Lin et al. |
| 10,491,840 B2 | 11/2019 | Okazawa |

(Continued)

OTHER PUBLICATIONS

International Search Report (PCT/ISA/210) and Written Opinion (PCT/ISA/237) dated Mar. 8, 2022 issued by the International Searching Authority in International Application No. PCT/KR2021/017266.

*Primary Examiner* — Wesner Sajous
(74) *Attorney, Agent, or Firm* — Sughrue Mion, PLLC

(57) ABSTRACT

A method for generating an image that includes at least one of a vignette effect or a grain effect corresponding to an input image may include obtaining the input image including at least one of the vignette effect or the grain effect; identifying at least one of a vignette parameter or a grain parameter of the input image; obtaining at least one of a vignette filter based on the vignette parameter or a grain layer based on the grain parameter; and generating the image that includes at least one of the vignette effect or the grain effect by applying at least one of the vignette filter or the grain layer to the image.

17 Claims, 16 Drawing Sheets

(51) Int. Cl.
*H04N 5/77* (2006.01)
*H04N 5/225* (2006.01)
*H04N 5/238* (2006.01)

(58) Field of Classification Search
CPC . G06F 3/0485; G06F 3/04847; G06K 9/6256;
G06V 10/507
See application file for complete search history.

(56) References Cited

U.S. PATENT DOCUMENTS

| | | |
|---|---|---|
| 2014/0099042 A1 | 4/2014 | Liege et al. |
| 2015/0109324 A1* | 4/2015 | Ubillos ................ G06T 11/001 |
| | | 345/594 |
| 2016/0100101 A1* | 4/2016 | Cohen ................ H04N 5/23206 |
| | | 348/207.1 |
| 2018/0227506 A1* | 8/2018 | Lee .................... H04N 5/23218 |
| 2018/0268533 A1 | 9/2018 | Mech et al. |
| 2018/0357800 A1 | 12/2018 | Oxholm et al. |
| 2020/0133469 A1* | 4/2020 | Ubillos ................ H04N 1/3877 |
| 2020/0202502 A1 | 6/2020 | Tsymbalenko |
| 2020/0382755 A1 | 12/2020 | DiVerdi et al. |
| 2021/0149549 A1* | 5/2021 | Ubillos ............... G06F 3/04842 |
| 2021/0360215 A1* | 11/2021 | Hofmann ................ H04N 9/79 |

* cited by examiner

SYSTEM AND METHOD FOR OBTAINING AND APPLYING A VIGNETTE FILTER AND GRAIN LAYER

CROSS-REFERENCE TO RELATED APPLICATION(S)

This application is based on and claims priority under 35 U.S.C. § 119 to U.S. Provisional Patent Application Nos. 63/135,532 and 63/135,540, filed on Jan. 8, 2021, in the U.S. Patent & Trademark Office, the disclosures of which are incorporated by reference herein in their entireties.

BACKGROUND

1. Field

The disclosure relates to a system and a method for generating an image that includes at least one of a vignette effect or a grain effect corresponding to an input image. More specifically, the disclosure relates to a system and a method for obtaining a vignette filter and/or a grain layer based on a vignette parameter and/or a grain parameter of an input image, and generating an image including a vignette effect and/or a grain effect of the input image by applying the vignette filter and/or the grain layer.

2. Description of Related Art

With the increased usage of personal smartphones as cameras, most smartphones support camera filters that can be applied in real time to the camera's video stream. Such filters come preinstalled with the smartphone, or can be downloaded from a third party. The goal of filter stylizing is to give the captured photos some desired visual effect. Most image stylizing filters modify the colors, tone, or contrast of the images.

SUMMARY

According to an aspect of an example embodiment, a method for generating an image that includes at least one of a vignette effect or a grain effect corresponding to an input image may include obtaining the input image including at least one of the vignette effect or the grain effect; identifying at least one of a vignette parameter or a grain parameter of the input image; obtaining at least one of a vignette filter based on the vignette parameter or a grain layer based on the grain parameter; and generating the image that includes at least one of the vignette effect or the grain effect by applying at least one of the vignette filter or the grain layer to the image.

The method may include identifying average pixel intensities of concentric radial intensity bands of the input image; inputting the average pixel intensities of the concentric radial intensity bands into a machine learning model; and identifying the vignette parameter based on an output of the machine learning model.

The method may include multiplying the image by the vignette filter; and generating the image based on multiplying the image by the vignette filter.

The method may include dividing the input image into a plurality of patches; inputting the plurality of patches into a machine learning model; and identifying the grain parameter based on an output of the machine learning model.

The machine learning model may be trained based on a plurality of training images including different vignette strengths.

The machine learning model may be trained based on a plurality of training images including different grain strengths.

The method may include generating the vignette filter or the grain layer; storing the vignette filter or the grain layer; and applying the vignette filter or the grain layer to another image during capture of the other image in real-time.

According to an aspect of an example embodiment, a device for generating an image that includes at least one of a vignette effect or a grain effect corresponding to an input image may include a memory configured to store instructions; and a processor configured to execute the instructions to: obtain the input image including at least one of the vignette effect or the grain effect; identify at least one of a vignette parameter or a grain parameter of the input image; obtain at least one of a vignette filter based on the vignette parameter or a grain layer based on the grain parameter; and generate the image that includes at least one of the vignette effect or the grain effect by applying at least one of the vignette filter or the grain layer to the image.

According to an aspect of an example embodiment, a non-transitory computer-readable medium may store instructions that, when executed by one or more processors of a device for generating an image that includes at least one of a vignette effect or a grain effect corresponding to an input image, cause the one or more processors to: obtain the input image including at least one of the vignette effect or the grain effect; identify at least one of a vignette parameter or a grain parameter of the input image; obtain at least one of a vignette filter based on the vignette parameter or a grain layer based on the grain parameter; and generate the image that includes at least one of the vignette effect or the grain effect by applying at least one of the vignette filter or the grain layer to the image.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The present disclosure provides a system and a method for obtaining one or two spatially varying filter effects from an image (i.e., vignette and/or grain). The system and method identify filters in a user-supplied stylized image, identify the filter parameters, and then obtain a new on-device filter. The obtained filter can then be selected by the user and applied to any input image or video feed in real time. The system and method are efficient, and improve the utilization of processor and memory resources, which permits integration with mobile camera hardware.

Figure 1:
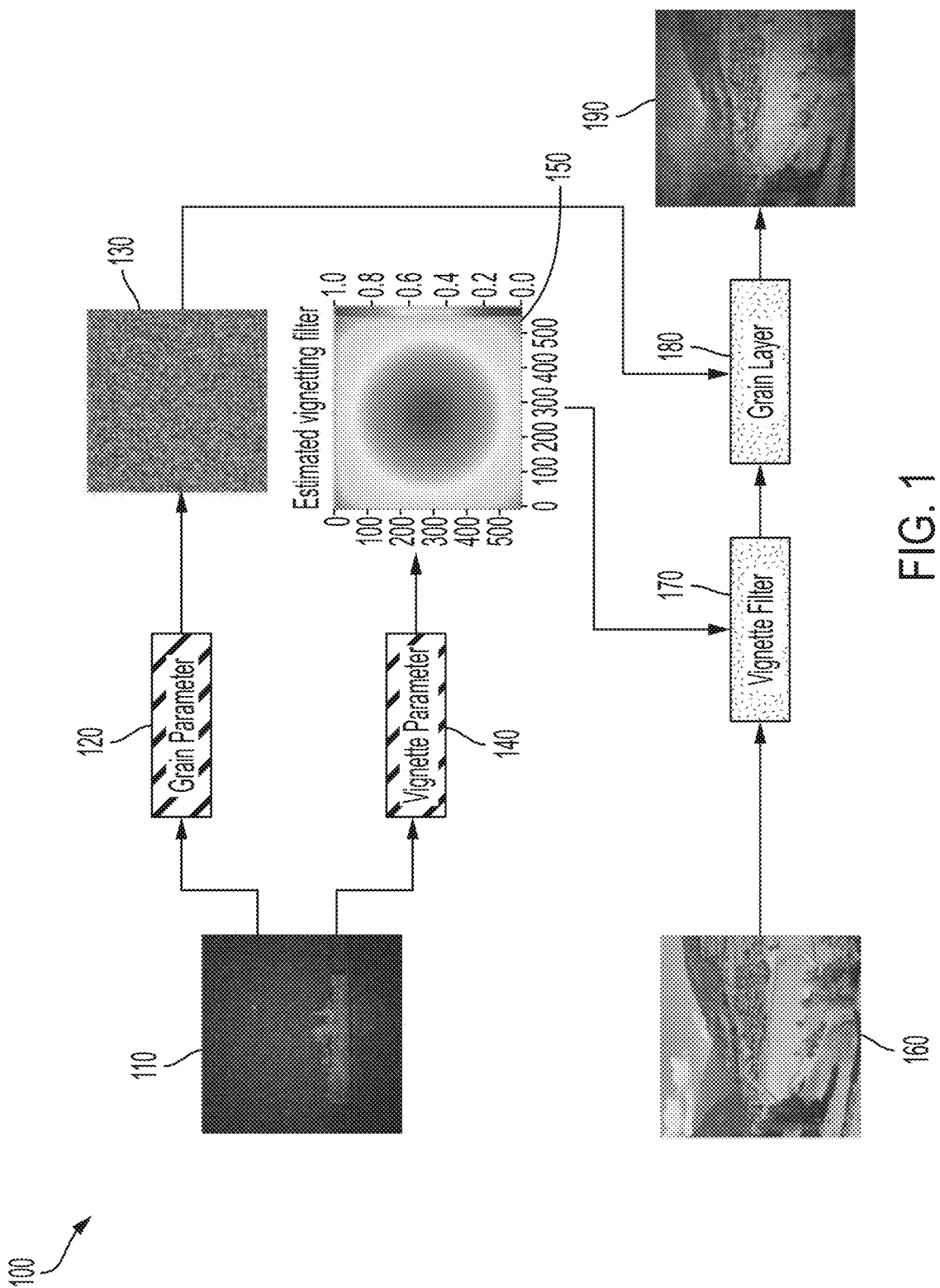
FIG. 1 is a diagram of a method for obtaining and applying a vignette filter and a grain layer according to an example embodiment.

FIG. 1 is a diagram of a method for obtaining and applying a vignette filter and a grain layer according to an example embodiment. More specifically, FIG. 1 depicts a method 100 for generating an image 190 that includes at least one of a vignette effect or a grain effect corresponding to an input image 110.

As shown in FIG. 1, a device (e.g., a smartphone, a server, etc.) may obtain an input image 110 including a vignette effect and a grain effect. Based on obtaining the input image 110, the device may identify a grain parameter 120 of the input image 110, and obtain a grain layer 130 based on the grain parameter 120. Further, the device may identify a vignette parameter 140 of the input image 110, and obtain a vignette filter 150 based on the vignette parameter 140. The device may obtain an image 160 to which the vignette effect and the grain effect of the input image 110 are to be applied. Based on obtaining the image 160, the device may generate an output image 190 that includes the vignette effect and the grain effect of the input image 110 by applying the grain layer 130 and the vignette filter 150. Although FIG. 1 depicts the device as obtaining a vignette filter 150 and a grain layer 130, it should be understood that the device may obtain only the vignette filter 150 or only the grain layer 130 such as in the situation where the input image 110 includes only the vignette effect or only the grain effect.

Figure 2:
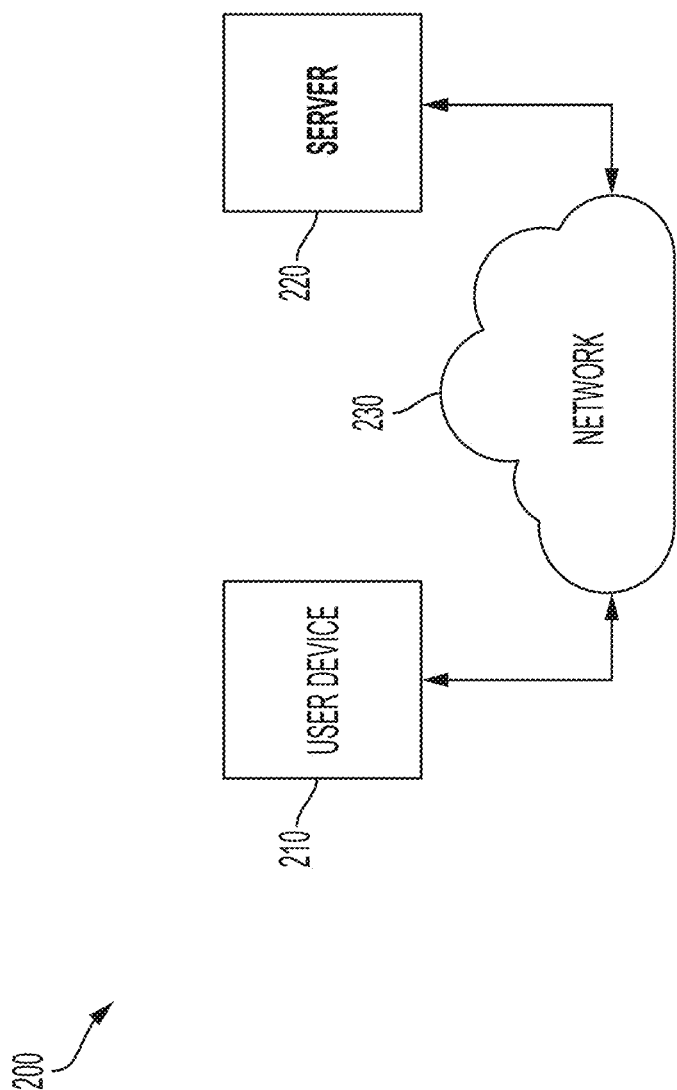
FIG. 2 is a diagram of a system for obtaining and applying a vignette filter and a grain layer according to an example embodiment.

FIG. 2 is a diagram of a system for obtaining and applying a vignette filter and a grain layer according to an example embodiment. As shown in FIG. 2, environment 200 may include a user device 210, a server 220, and a network 230. Devices of environment 200 may interconnect via wired connections, wireless connections, or a combination of wired and wireless connections.

The user device 210 includes one or more devices configured to obtain and apply a vignette filter and a grain layer. For example, the user device 210 may include a desktop computer, a laptop computer, a tablet computer, a handheld computer, a smart speaker, a server, a smart phone, a wearable device, or the like.

The server 220 includes one or more devices configured to obtain and apply a vignette filter and a grain layer. The server 220 may include a server, a cloud server, or the like.

The network 230 includes one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
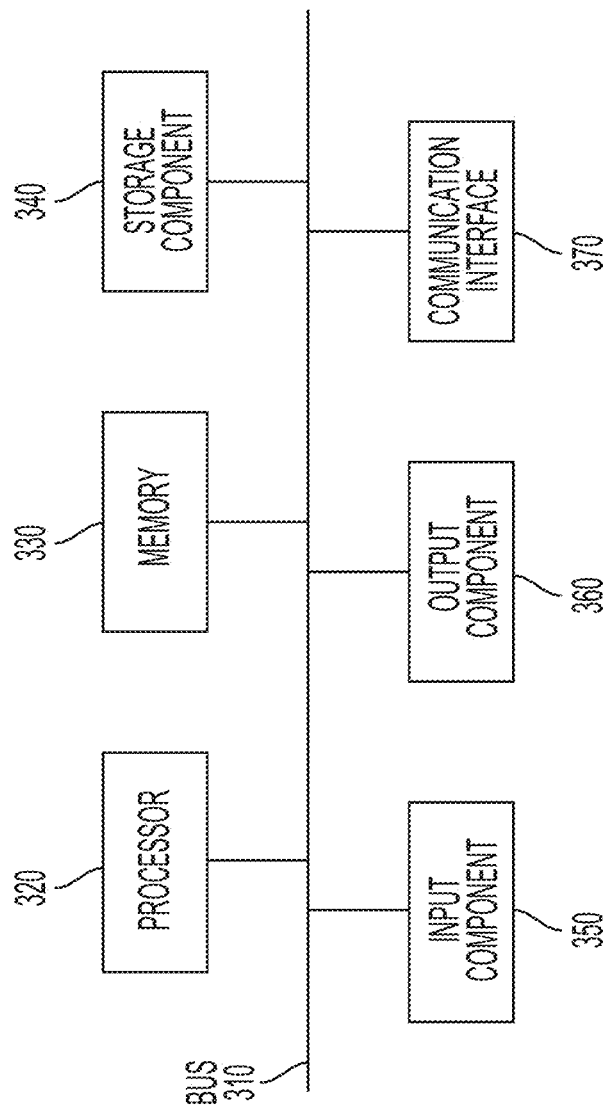
FIG. 3 is a diagram of components of the system of FIG. 2.

FIG. 3 is a diagram of example components of a device 300. Device 300 may correspond to the user device 210 and/or the server 220. As shown in FIG. 3, device 300 may include a bus 310, a processor 320, a memory 330, a storage component 340, an input component 350, an output component 360, and a communication interface 370.

The bus 310 includes a component that permits communication among the components of the device 300. The processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), an image signal processor (ISP), or another type of processing component. The processor 320 includes one or more processors capable of being programmed to perform a function.

The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables device 300 to communicate with other devices, such as via a wired connection, a wireless connection, or a combination of wired and wireless connections. The communication interface 370 may permit device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes based on the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
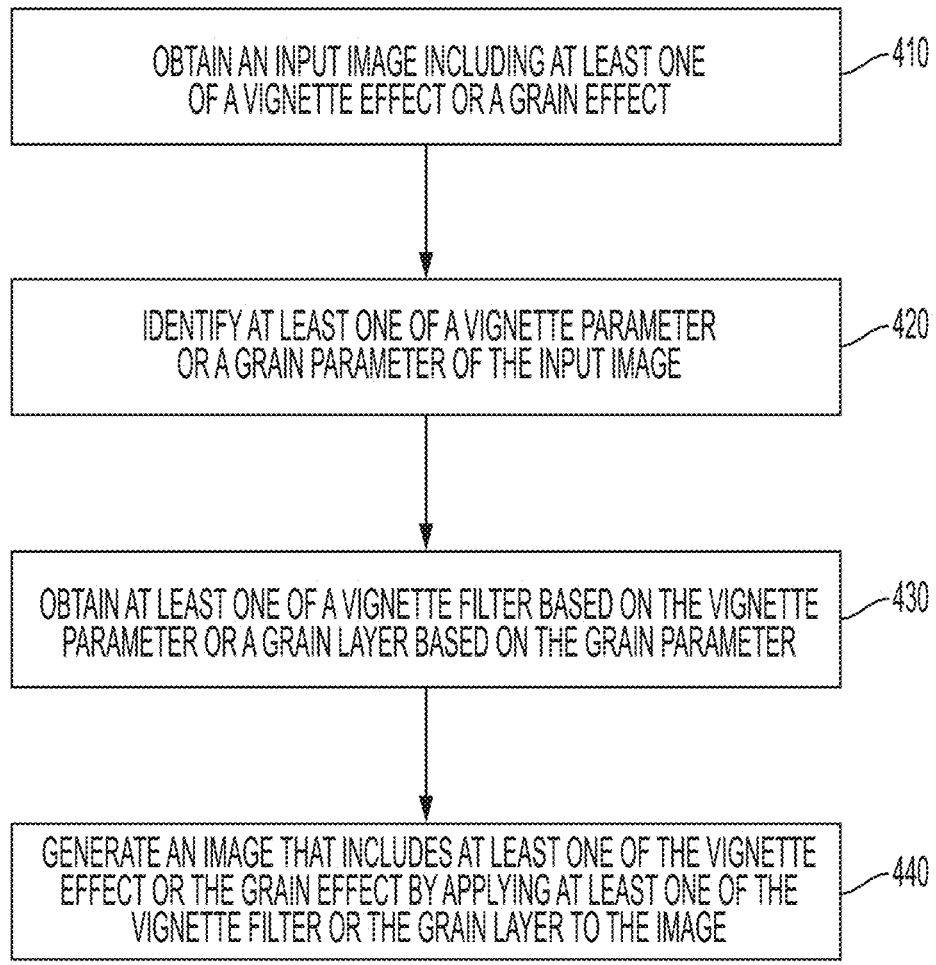
FIG. 4 is a flowchart of a process for obtaining and applying a vignette filter and a grain layer according to an example embodiment.

FIG. 4 is a flowchart of a process for obtaining and applying a vignette filter and a grain layer according to an example embodiment. The operations of FIG. 4 may be performed by the user device 210, the server 220, or a combination of the user device 210 and the server 220.

As shown in FIG. 4, the process may include obtaining an input image including at least one of a vignette effect or a grain effect (operation 410). For example, a device (e.g., the user device 210 and/or the server 220) may obtain an input image including at least one of a vignette effect or a grain effect. The device may obtain the input image from the Internet, from another device, from an application, from a camera, or the like. The vignette effect may be a reduction of the input image's brightness or saturation toward the periphery compared to the image center of the input image. The grain effect may be the random optical texture of processed photographic film due to the presence of small particles of a metallic silver, or dye clouds, developed from silver halide that have received enough photons. The input image may include only the vignette effect, only the grain effect, or both the vignette effect and the grain effect.

As further shown in FIG. 4, the process may include identifying at least one of a vignette parameter or a grain parameter of the input image (operation 420). The device may identify a vignette parameter of the input image, may identify a grain effect of the image, or may identify both the vignette parameter and the grain parameter of the input image. The vignette parameter may be a parameter that identifies an amount of vignetting of the input image. For example, the vignette parameter may be a vignette strength of the input image. The grain parameter may be a parameter that identifies an amount of grain of the input image. For example, the grain parameter may be a grain intensity of the input image.

The device may identify the vignette parameter based on identifying a vignette feature of the input image, and inputting the vignette feature into a trained machine learning model that is configured to output the vignette parameter. For example, the device may identify average pixel intensities of concentric radial intensity bands of the input image; input the average pixel intensities of the concentric radial intensity bands into the machine learning model; and identifying the vignette parameter (e.g., vignette strength) based on an output of the machine learning model. The machine learning model may be trained based on a plurality of training images including different vignette strengths.

The device may identify the grain parameter based on identifying a grain feature of the input image, and inputting the grain feature into a trained machine learning model that is configured to output the grain parameter. For example, the device may divide the input image into a plurality of patches; input the plurality of patches into the machine learning model; and identify the grain parameter (e.g., the grain intensity) based on an output of the machine learning model. The machine learning model may be trained based on a plurality of training images including different grain strengths.

As further shown in FIG. 4, the process may include obtaining at least one of a vignette filter based on the vignette parameter or a grain layer based on the grain parameter (operation 430). The device may obtain a vignette filter based on the vignette parameter, may obtain a grain layer based on the grain parameter, or may obtain a vignette filter based on the vignette parameter and obtain a grain layer based on the grain parameter. The device may obtain the vignette filter by using the vignette parameter. The device may obtain the grain layer by using the grain parameter.

As further shown in FIG. 4, the process may include generating an image that includes at least one of the vignette effect or the grain effect by applying at least one of the vignette filter or the grain layer to the image (operation 440).

The device may generate and obtain the vignette filter, and store the vignette filter so that the vignette filter can be applied to another image during capture of the other image in real-time. Additionally, or alternatively, the device may generate and obtain the grain layer, and store the grain layer so that the grain layer can be applied to another image during capture of the other image in real-time. In this way, the device may obtain an image (e.g., using a camera of the device), and apply the vignette filter and/or the grain layer to the input image. More specifically, the device may multiply the image by the vignette filter, or may add the grain layer to the image.

Figure 5A:
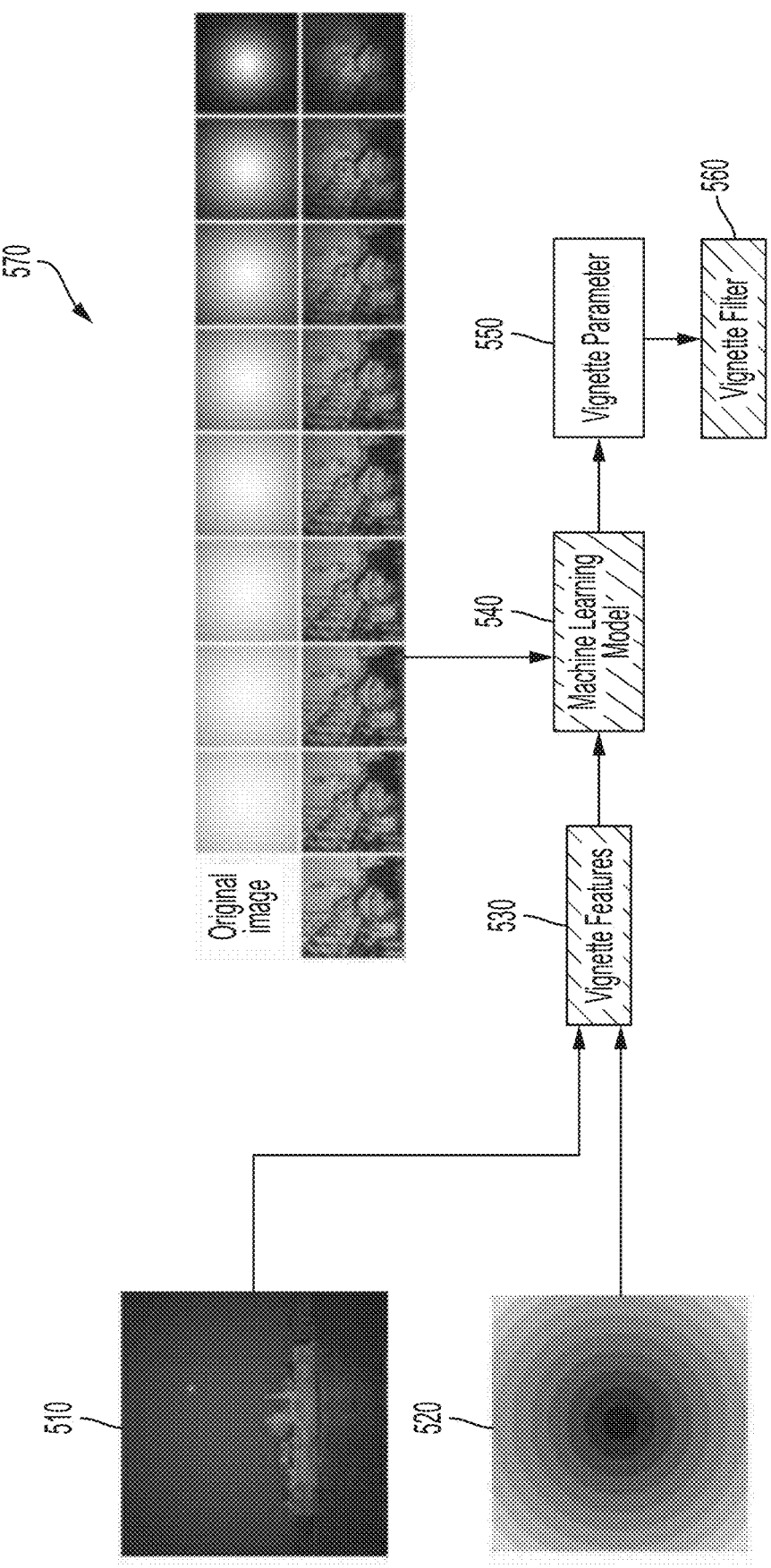
FIGS. 5A-5C are diagrams of a method for obtaining and applying a vignette filter according to an example embodiment.
Figure 5B:
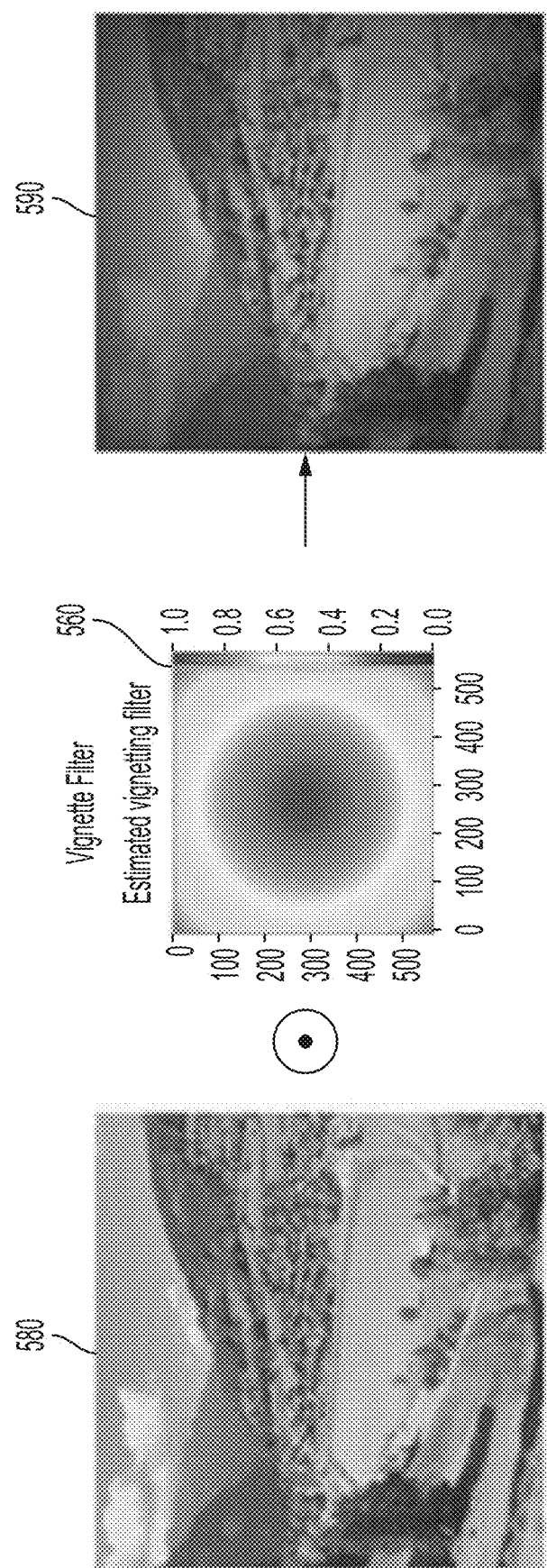
Figure 5C:
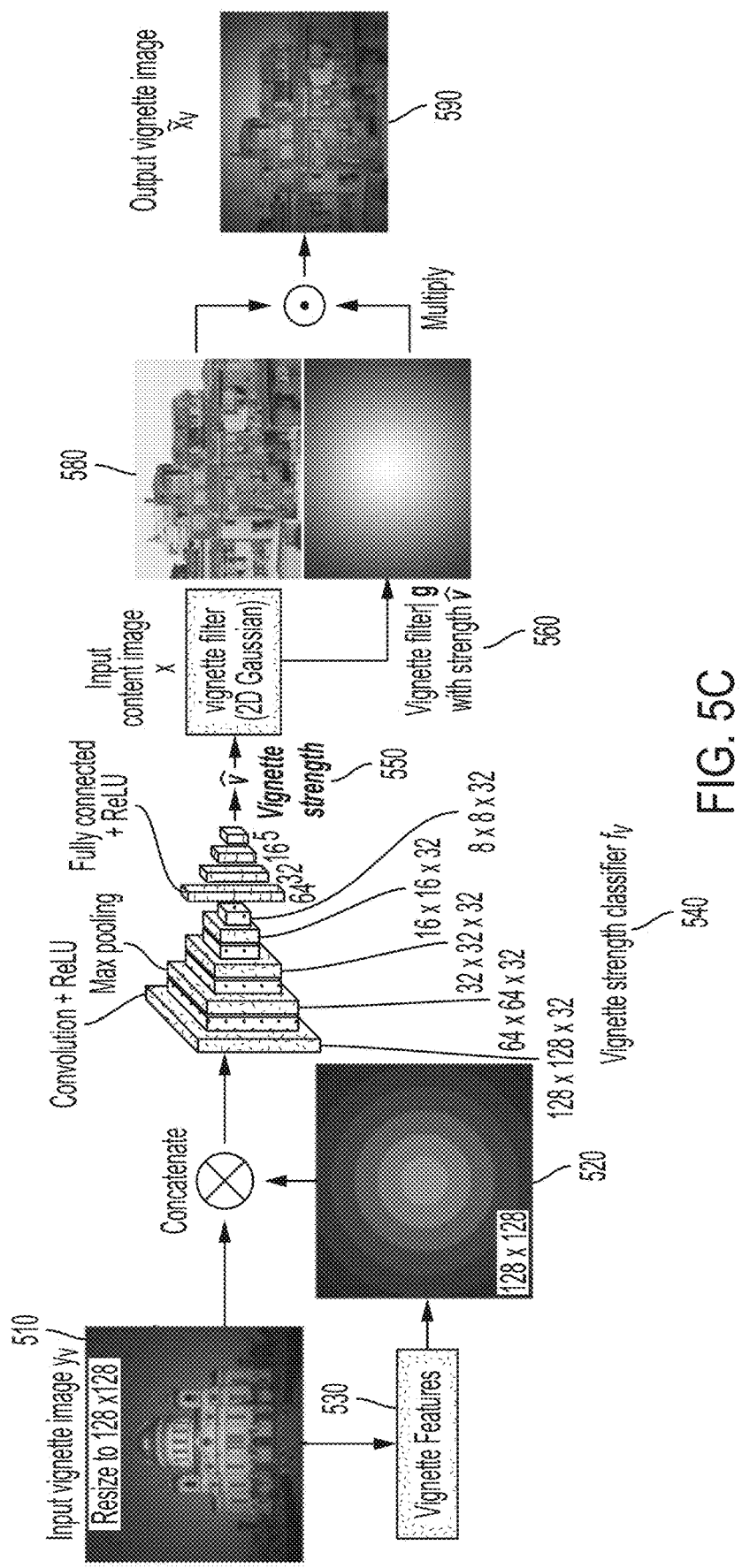

FIGS. 5A-5C are diagrams of a method for obtaining and applying a vignette filter according to an example embodiment. The operations of FIGS. 5A-5C may be performed by the user device 210, the server 220, or a combination of the user device 210 and the server 220.

As shown in FIG. 5A, a device (e.g., the user device 210 or the server 220) may obtain an input image 510 that includes a vignette effect. The device may identify concentric radial intensity bands 520 of the input image 510. The device may identify vignette features 530 of the input image 510 based on the input image 510 and the concentric radial intensity bands 520 of the input image 510. For example, the device may identify vignette features such as the average pixel intensities of the concentric radial intensity bands 520 of the input image 510. The device may input the vignette features 530 into a machine learning model 540, and obtain a vignette parameter 550 based on an output of the machine learning model 540. The device may obtain a vignette filter 560 based on the vignette parameter 550. As shown in FIG. 5A, the machine learning model 540 may be trained using training data 570 including different vignette parameters, as described in more detail in association with FIG. 7. As shown in FIG. 5B, the device may obtain an image 580, and generate an image 590 that includes a vignette effect of the input image 510 by applying the vignette filter 560.

FIG. 5C is a diagram of another method for obtaining and applying a vignette filter. As shown in FIG. 5C, a device (e.g., the user device 210 and/or the server 220) obtains an input vignette image $y_v$ (input image 510). The device is configured to identify the vignette parameter (vignette parameter 550) from a filtered input or stylized image y (input image 510), apply the estimated filter parameter $\hat{p}$ to obtain a vignette filter (vignette filter 560), and apply the vignette filter (vignette filter 560) to an input content image x (image 580).

The device is configured to determine:

$$\hat{p}=f(y), \quad (1)$$

$$\tilde{x}=h(x,\hat{p}), \quad (2)$$

As shown in Equations (1) and (2) above, $\hat{p}$ is a generic filter parameter that can represent either vignette strength $\hat{v}$ or grain intensity $\hat{g}$.

f(•) is a generic filter parameter estimator that can represent the vignette strength estimator $f_v(•)$ (machine learning model 540) or the grain intensity classifier $f_g(•)$ (machine learning model 620). Further, f(•) is a function to estimate the vignette parameter (vignette parameter 550) and h(•) is a function that regenerates the vignette filter (vignette filter 560) and applies the vignette filter to the input content image x (image 580) to produce the filtered image $\tilde{x}$ (image 590).

Image vignetting filters decrease pixel intensities as they move away from the center of an image or approach the corners of the image. For efficiency, the device uses an isotropic 2D Gaussian filter to simulate vignetting, according to one embodiment.

Assuming the input content image is $x \in \mathbb{R}^{m \times n}$, with height m and width n, and the vignetting Gaussian filter is $g \in \mathbb{R}^{m \times n}$ with values in the range of [0, 1], the output vignetted image $\tilde{x}_v \in \mathbb{R}^{m \times n}$ is generated as:

$$\tilde{x}_v = g \odot x, \quad (3)$$

$$g_{i,j} = \frac{1}{2\pi\sigma^2} \exp\left(-\frac{i^2+j^2}{2\sigma^2}\right). \quad (4)$$

As shown in Equations (3) and (4) above, ⊙ denotes element-wise multiplication and i and j are pixel coordinates where the point of origin (0, 0) is at the center of the image.

To control vignetting strength (i.e., how much vignetting is in the image), the device re-parameterizes σ to define a discrete set of vignetting strengths $v \in \{0, \ldots, 8\}$.

$$\sigma=(1-0.1v)z, \quad (5)$$

$$z=\max(m,n). \quad (6)$$

The devices uses a lightweight convolutional neural network (CNN) $f_v(•)$ (machine learning model 540) to identify the vignetting strength $\hat{v}$, according to one embodiment.

$$\hat{v}=f_v(y_v), \quad (7)$$

As shown in Equation (7) above, $y_v$ is the input vignetted image. Because vignetting strengths below 5 are not visually strong, the device may train the network to predict strengths $v \in \{0,5,6,7,8\}$.

In one embodiment, the vignetting classifier $f_v(•)$ contains four convolutional layers, and each layer contains 32 filters with 3×3 kernels, followed by three fully connected layers with 64, 32, and 16 units. Each of the layers is followed by a rectified linear unit (ReLU). The last layer is fully connected with five units to predict the vignetting strength. The vignetting classifier network includes approximately 162 K parameters.

Using the images only as input to the network might not be sufficient to achieve high prediction accuracy of vignetting strength, especially when using a small network for the sake of efficiency. To boost the accuracy, the device may extract additional features from the images to assist with the vignetting strength identification. The device identifies the average pixel intensity in a set of ring-shaped areas around the image center. The device replicates these average intensities in radial intensity bands, which have the same size as the vignetted image. The radial intensity bands are then concatenated to the vignetted image as input to the vignetting classification network.

Based on the vignetting strength $\hat{v}$ being estimated, a vignetting filter is obtained using Equation (4), and then applied to the input content image x using Equation (3) to generate the output vignetted image $\tilde{x}_v$.

Figure 6A:
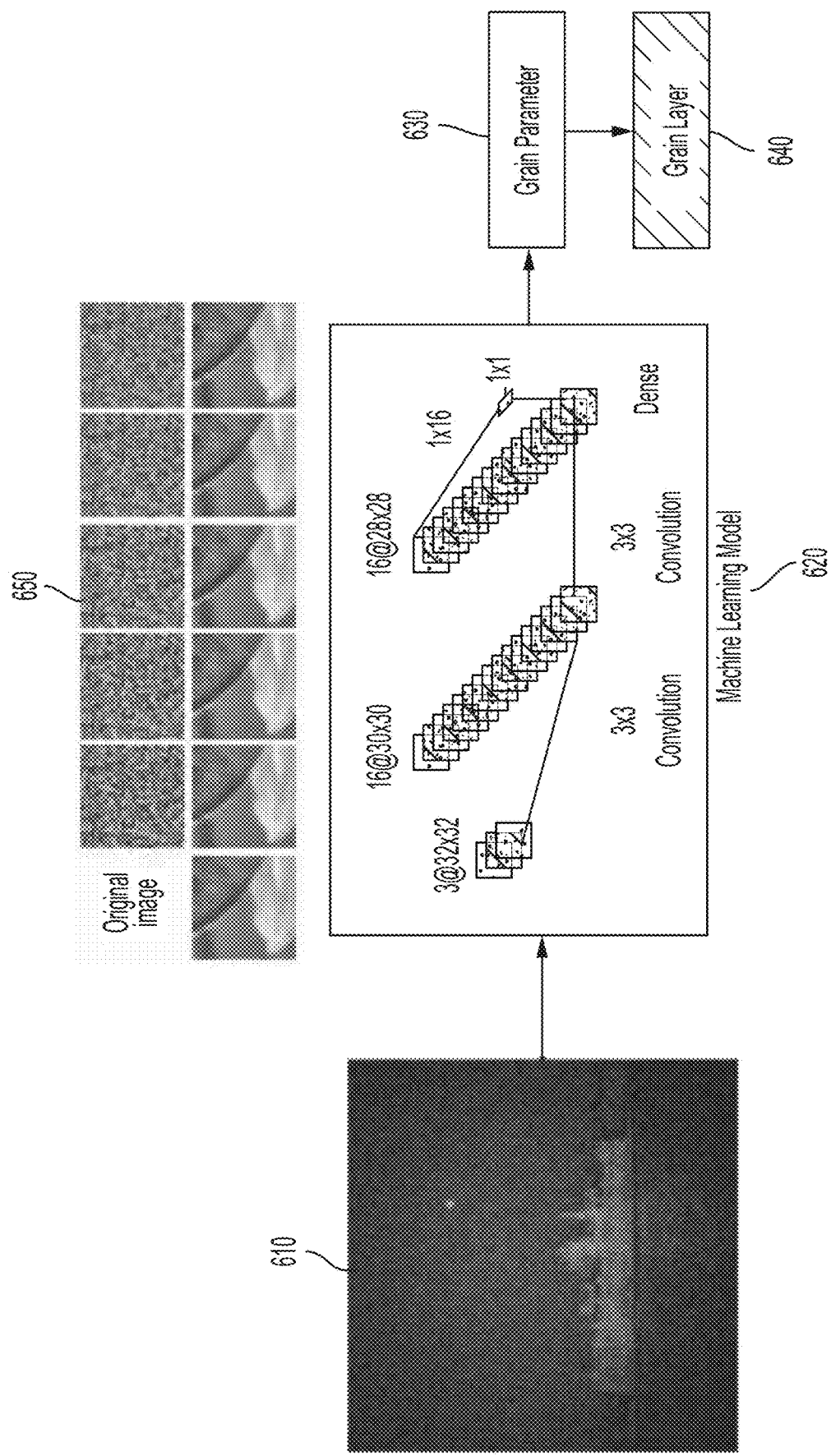
FIGS. 6A-6C are diagrams of a method for obtaining and applying a grain layer according to an example embodiment.
Figure 6B:
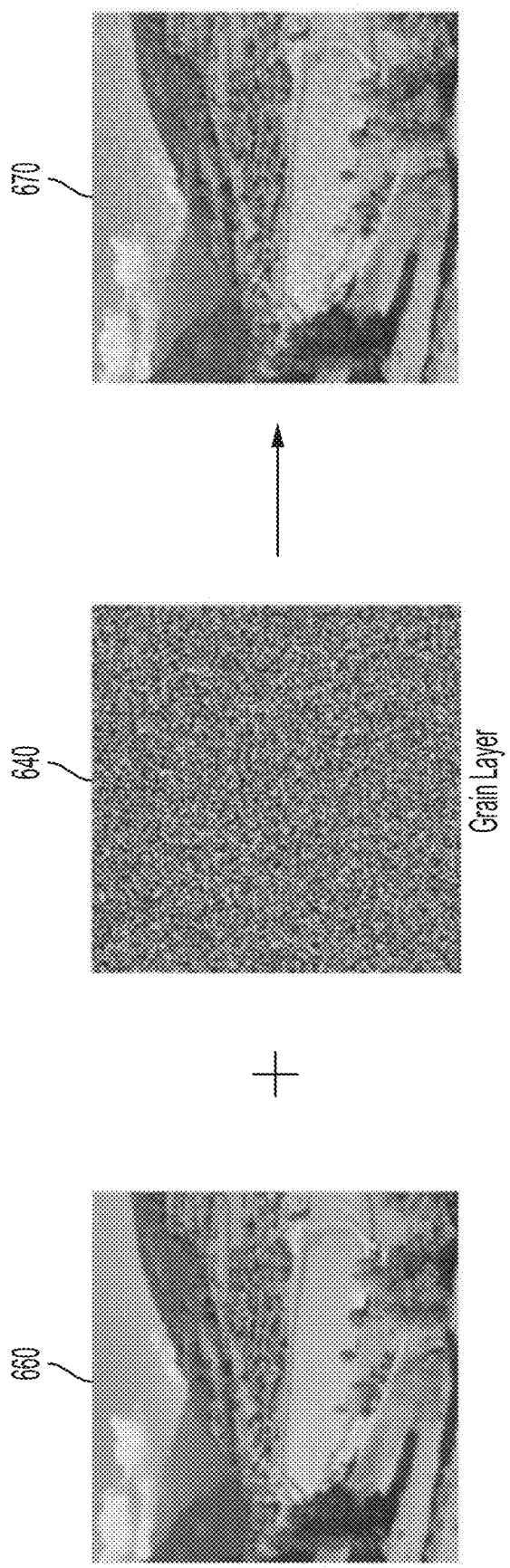
Figure 6C:
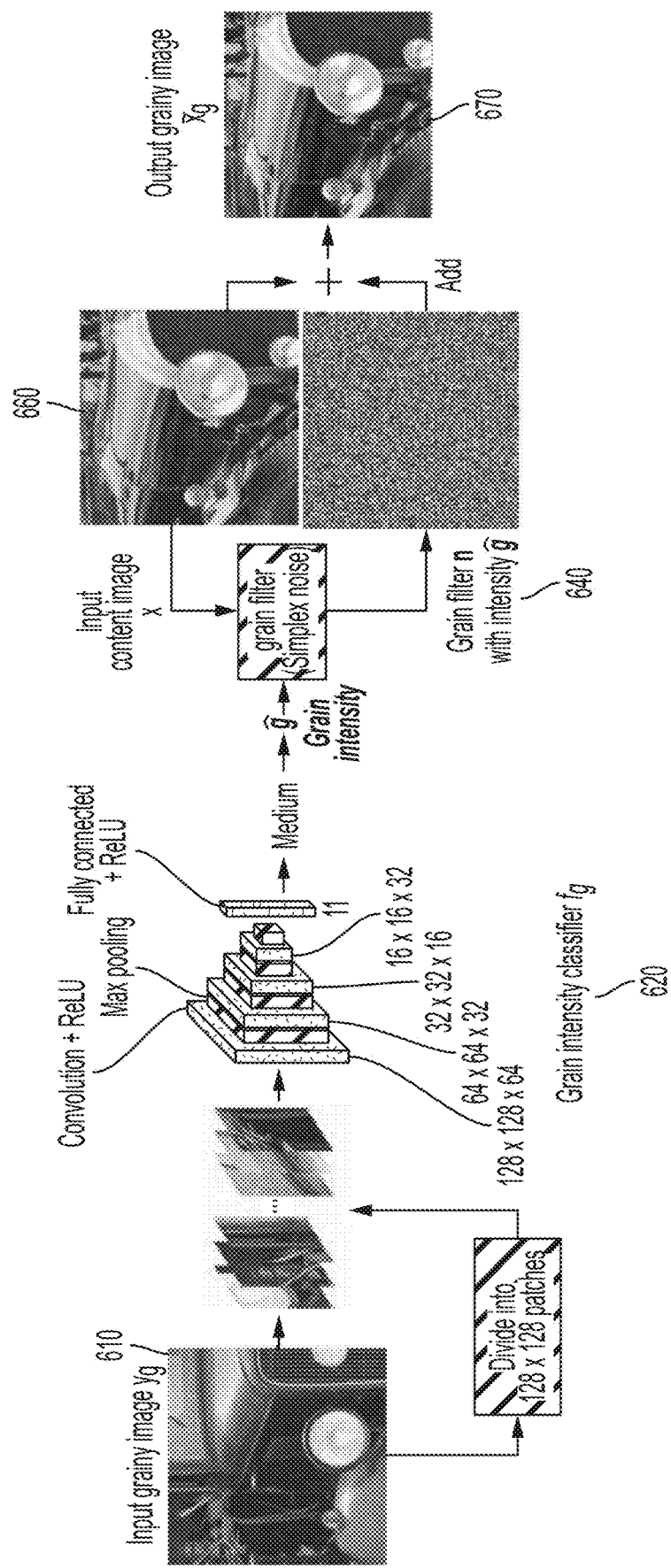

FIGS. 6A-6C are diagrams of a method for obtaining and applying a grain layer according to an example embodiment. The operations of FIGS. 6A-6C may be performed by the user device 210, the server 220, or a combination of the user device 210 and the server 220.

As shown in FIG. 6A, a device (e.g., the user device 210 or the server 220) may obtain an input image 610 that includes a grain effect. The device may input the input image 610 into a machine learning model 620, and obtain a grain parameter 630 based on an output of the machine learning model 620. The device may obtain a grain layer 640 based on the grain parameter 630. As shown in FIG. 6A, the machine learning model 620 may be trained using training data 650 including different grain parameters, as described in more detail in association with FIG. 8. As shown in FIG. 6B, the device may obtain an image 660, and generate an image 670 that includes a grain effect of the input image 610 by applying the grain layer 640.

FIG. 6C is a diagram of another method for obtaining and applying a grain layer.

Film grain includes random optical textures of processed photographic film due to the presence of small particles of metallic silver, or dye clouds, developed from silver halide interacting with light photons.

Assuming the input image (image 610) is $x \in \mathbb{R}^{m \times n}$, and the grain layer (grain layer 640), generated as Simplex noise with standard deviation of 1 is $n \in \mathbb{R}^{m \times n}$, the output grainy image (image 670) $\tilde{x}_g \in \mathbb{R}^{m \times n}$ may be generated as:

$$\tilde{x}_g=\text{clip}(x+gn), \quad (8)$$

As shown in Equation (8) above, clip (•) indicates clipping the image values between the underlying intensity range (e.g., [0, 255] or [0.0, 1.0]) and g represents grain intensity. Grain intensity indicates the magnitude of grain values added to the image.

The device uses a lightweight CNN (machine learning model 620) as a grain intensity classification model, according to one embodiment. Given an image, the device identifies the image's grain intensity. To detect fine-scale grain intensities, the device trains the network on 11 grain intensities in the range of [0, 0.5] with 0.05 steps, according to one embodiment. Images having a predicted class of 0 are considered as not having any grain. In one embodiment, the grain intensity classifier $f_g(\cdot)$ contains three convolutional layers, with 64, 32, and 16 filters, with 3×3 kernels. Each of the layers is followed by a ReLU. The last layer is fully connected with 11 units to predict grain intensity. The grain classifier network includes approximately 59 K parameters. Based on the grain intensity $\hat{g}$ being identified, a grain filter is obtained using OpenSimplex noise and then applied to the input content image x using Equation (8) to get the output grainy image $\tilde{x}_g$.

Figure 7:
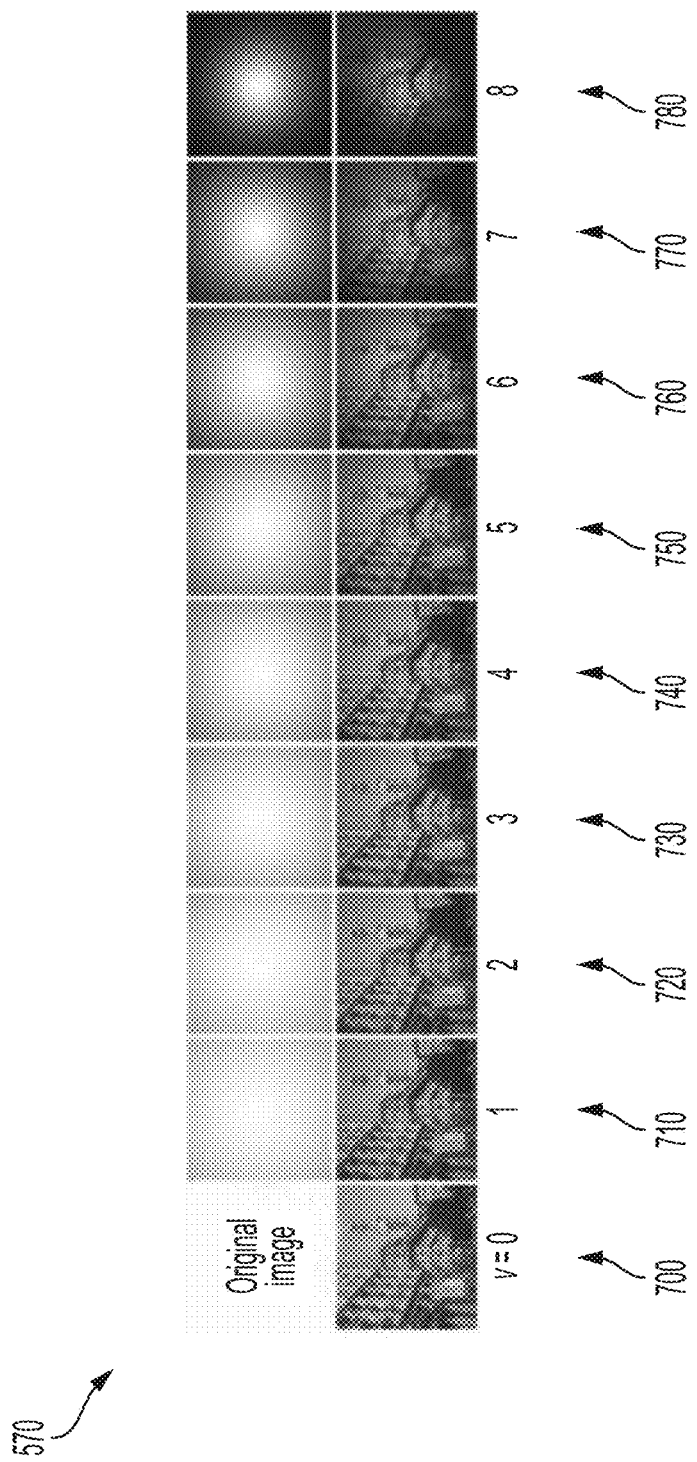
FIG. 7 is a diagram of training data for training a machine learning model for obtaining and applying a vignette filter according to an example embodiment.

FIG. 7 is a diagram of training data for training a machine learning model for obtaining and applying a vignette filter according to an example embodiment. As shown in FIG. 7, the training data 570 includes images 700 through 780 that include different vignette parameters. For example, the image 700 includes a vignette strength having a value of zero, the image 710 includes a vignette strength having a value of one, the image 720 includes a vignette strength having a value of two, etc. Although FIG. 7 depicts a particular number of training images 700, it should be understood that, in practice, the machine learning model may be trained using thousands, millions, etc., of training images.

Figure 8:
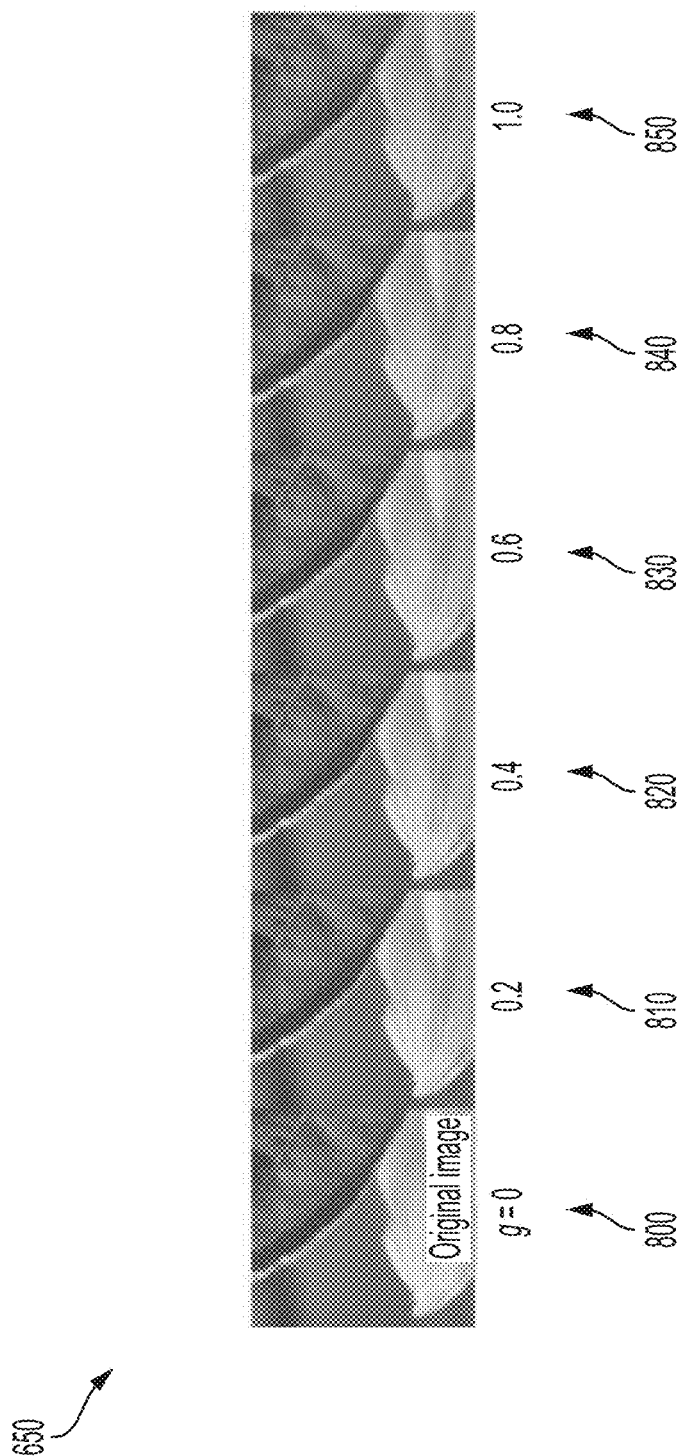
FIG. 8 is a diagram of training data for training a machine learning model for obtaining and applying a grain layer according to an example embodiment.

FIG. 8 is a diagram of training data for training a machine learning model for obtaining and applying a grain layer according to an example embodiment. As shown in FIG. 8, the training data 650 includes images 800 through 850 that include different grain parameters. For example, the image 800 includes a grain intensity having a value of zero, the image 810 includes a grain intensity having a value of 0.2, the image 820 includes a grain intensity having a value of 0.4, etc. Although FIG. 8 depicts a particular number of training images 800, it should be understood that, in practice, the machine learning model may be trained using thousands, millions, etc., of training images.

Figure 9A:
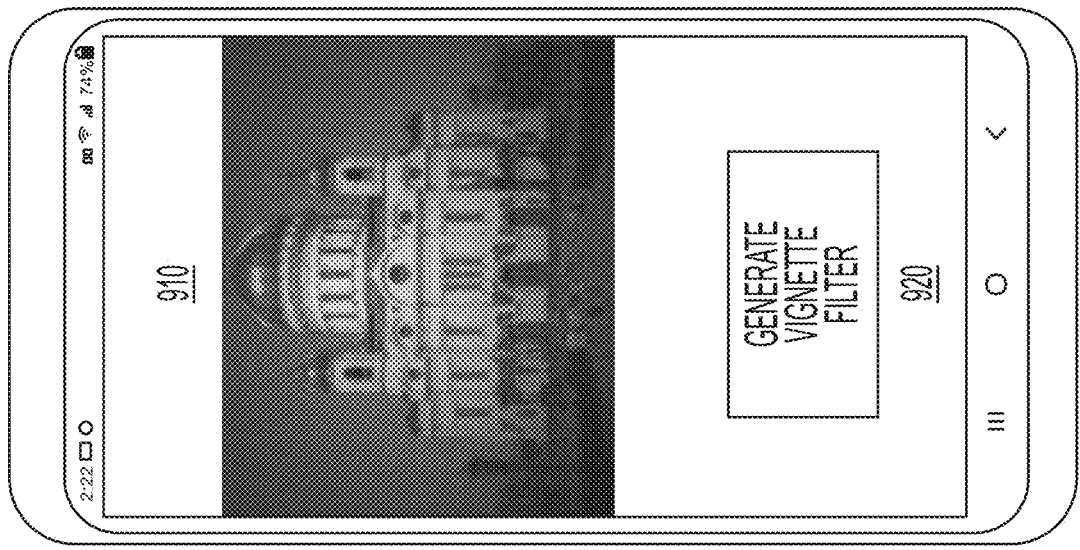
FIGS. 9A and 9B are diagrams of a user device for obtaining and applying a vignette filter according to an example embodiment.
Figure 9B:
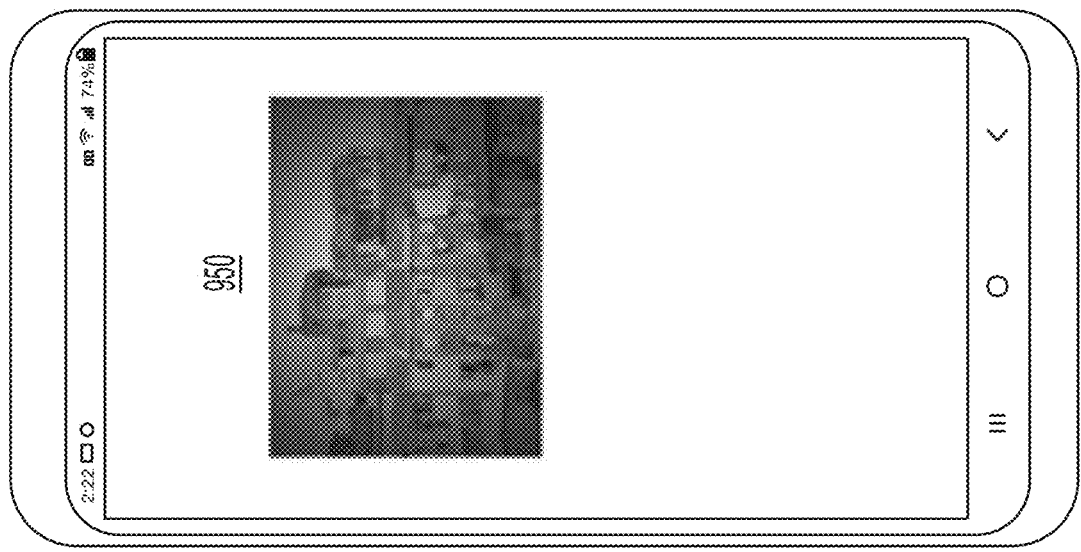
Figure 9B:
Figure 9B:
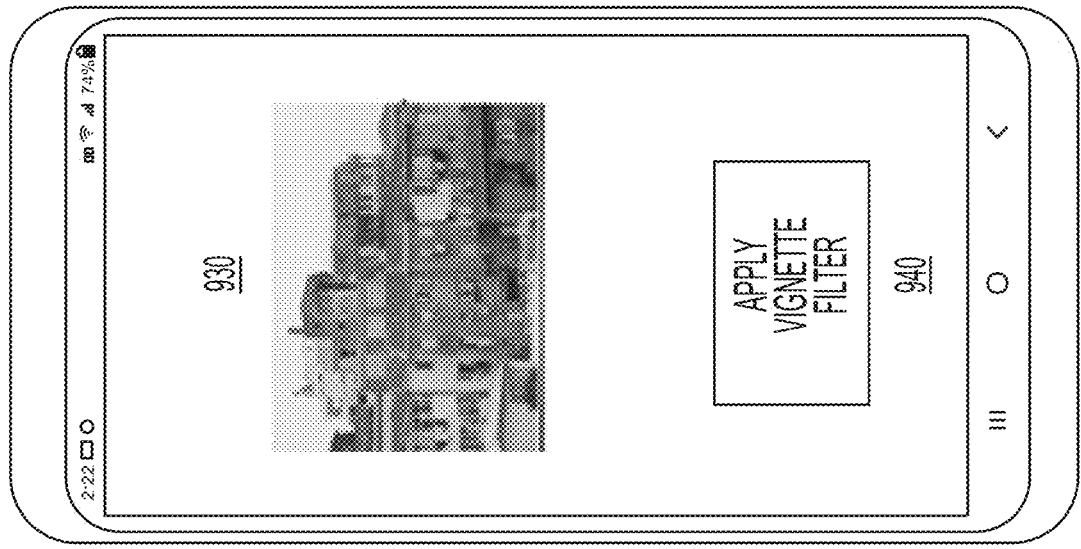

FIGS. 9A and 9B are diagrams of a user device for obtaining and applying a vignette filter according to an example embodiment.

As shown in FIG. 9A, a user device 210 may display an image 910. The user device 210 may obtain the image 910 from the Internet, from another device, from an application, or the like. The image 910 may include a vignette effect that the user wishes to replicate with other images. The user device 210 may display an icon 920 that permits the user to select the generation of a vignette filter. In this case, the user may perform a touch gesture in association with the icon 920 which causes the user device 210 to obtain a vignette filter based on the input image 910. That is, the user device 210 may identify a vignette parameter of the input image 910, and obtain a vignette filter based on the vignette parameter. The user device 210 may store the vignette filter based on obtaining the vignette filter. In this way, the user can apply the vignette filter to images in order to replicate the vignette effect of the input image 910.

As shown in FIG. 9B, the user device 210 may obtain an image 930 using a camera of the user device 210. The user device 210 may display an icon 940 that permits the user to select whether the vignette filter which was obtained in association with FIG. 9A is to be applied to the image 930. Based on a user selection of the icon 940, the user device 210 may generate an image 950 by applying the vignette filter to the input image 930. In this way, the image 950 may include a similar vignette effect as the image 910. Accordingly, embodiments herein permit a user to select an image for which a vignette effect is to be replicated, and permit the user device 210 to obtain a vignette filter that replicates the vignette effect.

Figure 10A:
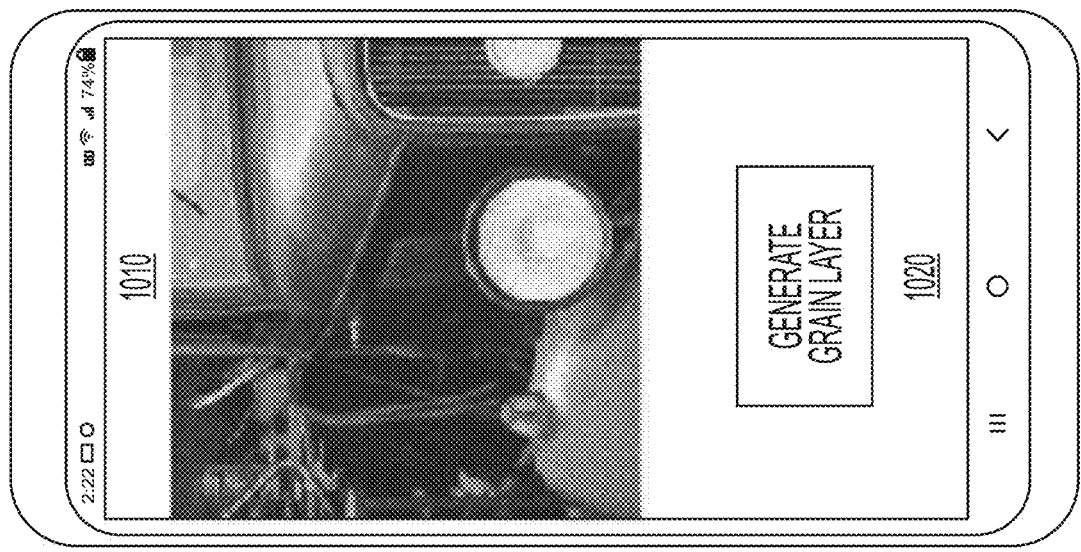
FIGS. 10A and 10B are diagrams of a user device for obtaining and applying a grain layer according to an example embodiment.
Figure 10B:
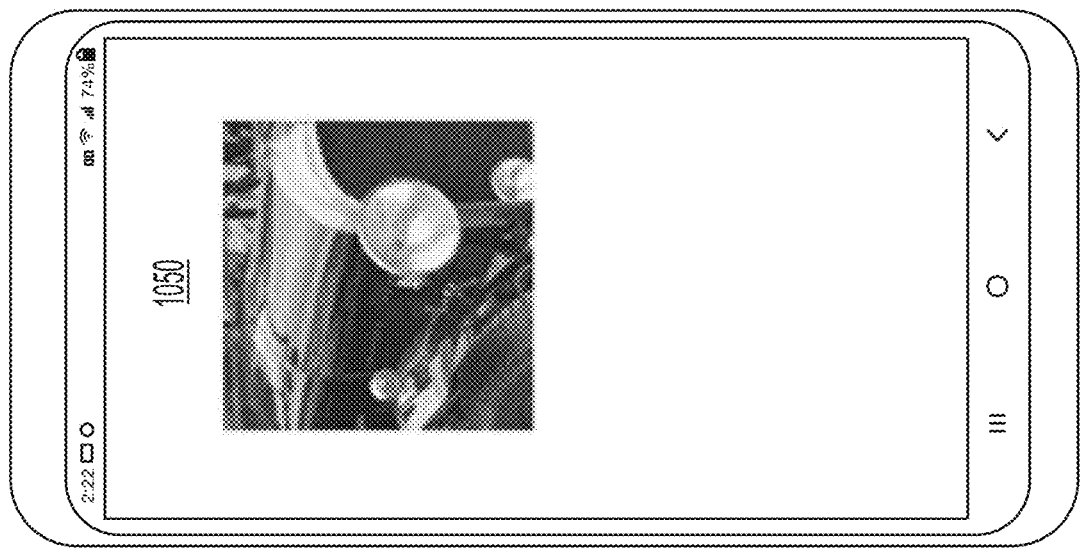
Figure 10B:
Figure 10B:
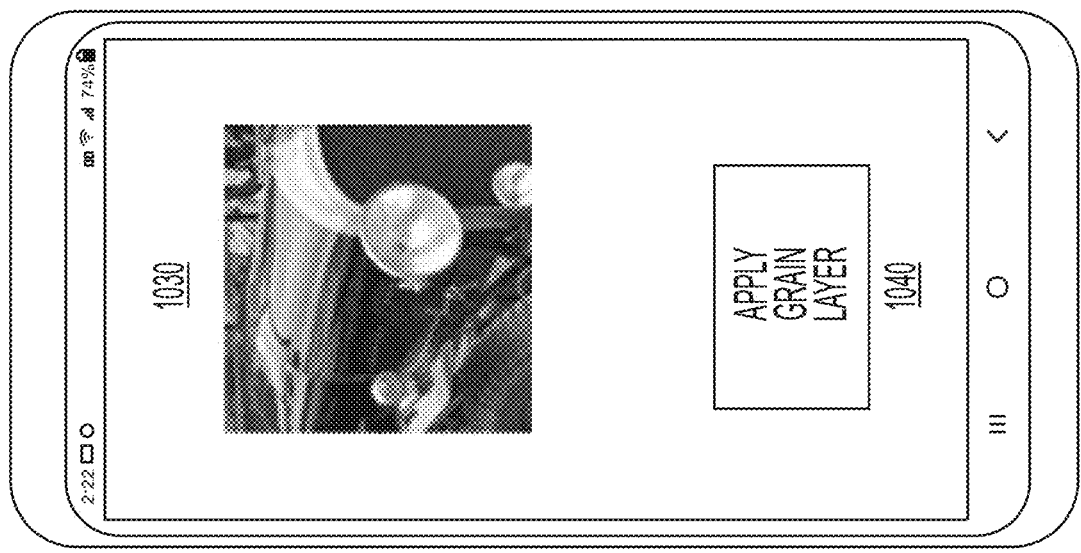

FIGS. 10A and 10B are diagrams of a user device for obtaining and applying a grain layer according to an example embodiment.

As shown in FIG. 10A, a user device 210 may display an image 1010. The user device 210 may obtain the image 1010 from the Internet, from another device, from an application, or the like. The image 1010 may include a grain effect that the user wishes to replicate with other images. The user device 210 may display an icon 1020 that permits the user to select the generation of a grain layer. In this case, the user may perform a touch gesture in association with the icon 1020 which causes the user device 210 to obtain a grain layer based on the input image 1010. That is, the user device 210 may identify a grain parameter of the input image 1010, and obtain a grain layer based on the grain parameter. The user device 210 may store the grain layer based on obtaining the grain layer. In this way, the user can apply the grain layer to images in order to replicate the grain effect of the input image 1010.

As shown in FIG. 10B, the user device 210 may obtain an image 1030 using a camera of the user device 210. The user device 210 may display an icon 1040 that permits the user to select whether the grain layer obtained in FIG. 10A is to be applied to the input image 1030. Based on a user selection of the icon 1040, the user device 210 may generate an image 1050 by applying the grain layer to the input image 1030. In this way, the image 1050 may include a similar grain effect as the image 1010. Accordingly, embodiments herein permit a user to select an image for which a grain effect is to be replicated, and permit the user device 210 to obtain a grain layer that replicates the grain effect.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for generating an image that includes at least one of a vignette effect or a grain effect corresponding to an input image, the method comprising:
   obtaining the input image including at least one of the vignette effect or the grain effect;
   identifying at least one of a vignette parameter or a grain parameter of the input image;
   obtaining at least one of a vignette filter based on the vignette parameter or a grain layer based on the grain parameter; and
   generating the image that includes at least one of the vignette effect or the grain effect by applying at least one of the vignette filter or the grain layer to the image,
   wherein the method further comprises:
      identifying average pixel intensities of concentric radial intensity bands of the input image;
      inputting the average pixel intensities of the concentric radial intensity bands into a first machine learning model; and
      identifying the vignette parameter based on an output of the first machine learning model.

2. The method of claim 1, further comprising:
   multiplying the image by the vignette filter; and
   generating the image based on multiplying the image by the vignette filter.

3. The method of claim 1, further comprising:
   dividing the input image into a plurality of patches;
   inputting the plurality of patches into a second machine learning model; and
   identifying the grain parameter based on an output of the second machine learning model.

4. The method of claim 1, wherein the first machine learning model is trained based on a plurality of training images including different vignette strengths.

5. The method of claim 3, wherein the second machine learning model is trained based on a plurality of training images including different grain strengths.

6. The method of claim 1, further comprising:
   generating the vignette filter or the grain layer;
   storing the vignette filter or the grain layer; and
   applying the vignette filter or the grain layer to another image during capture of the another image in real-time.

7. A device for generating an image that includes at least one of a vignette effect or a grain effect corresponding to an input image, the device comprising:
   a memory configured to store instructions; and
   a processor configured to execute the instructions to:
      obtain the input image including at least one of the vignette effect or the grain effect;
      identify at least one of a vignette parameter or a grain parameter of the input image;
      obtain at least one of a vignette filter based on the vignette parameter or a grain layer based on the grain parameter; and
      generate the image that includes at least one of the vignette effect or the grain effect by applying at least one of the vignette filter or the grain layer to the image,
   wherein the processor is further configured to:
      identify average pixel intensities of concentric radial intensity bands of the input image;
      input the average pixel intensities of the concentric radial intensity bands into a first machine learning model; and
      identify the vignette parameter based on an output of the first machine learning model.

8. The device of claim 7, wherein the processor is further configured to:
   multiply the image by the vignette filter; and
   generate the image based on multiplying the image by the vignette filter.

9. The device of claim 7, wherein the processor is further configured to:
   divide the input image into a plurality of patches;
   input the plurality of patches into a second machine learning model; and
   identify the grain parameter based on an output of the second machine learning model.

10. The device of claim 7, wherein the first machine learning model is trained based on a plurality of training images including different vignette strengths.

11. The device of claim 9, wherein the second machine learning model is trained based on a plurality of training images including different grain strengths.

12. The device of claim 7, wherein the processor is further configured to:
   generate the vignette filter or the grain layer;
   store the vignette filter or the grain layer; and
   apply the vignette filter or the grain layer to another image during capture of the another image in real-time.

13. A non-transitory computer-readable medium storing instructions, the instructions comprising: one or more instructions that, when executed by one or more processors of a device for generating an image that includes at least one of a vignette effect or a grain effect corresponding to an input image, cause the one or more processors to:
   obtain the input image including at least one of the vignette effect or the grain effect;
   identify at least one of a vignette parameter or a grain parameter of the input image;
   obtain at least one of a vignette filter based on the vignette parameter or a grain layer based on the grain parameter; and
   generate the image that includes at least one of the vignette effect or the grain effect by applying at least one of the vignette filter or the grain layer to the image,
   wherein the one or more instructions further cause the one or more processors to:
      identify average pixel intensities of concentric radial intensity bands of the input image;
      input the average pixel intensities of the concentric radial intensity bands into a first machine learning model; and
      identify the vignette parameter based on an output of the first machine learning model.

14. The non-transitory computer-readable medium of claim 13, wherein the one or more instructions further cause the one or more processors to:
   multiply the image by the vignette filter; and
   generate the image based on multiplying the image by the vignette filter.

15. The non-transitory computer-readable medium of claim 13, wherein the one or more instructions further cause the one or more processors to:
   divide the input image into a plurality of patches;
   input the plurality of patches into a second machine learning model; and
   identify the grain parameter based on an output of the second machine learning model.

16. The non-transitory computer-readable medium of claim 13, wherein the first machine learning model is trained based on a plurality of training images including different vignette strengths.

17. The non-transitory computer-readable medium of claim 15, wherein the second machine learning model is trained based on a plurality of training images including different grain strengths.

* * * * *